United States Patent [19]

Matsumura

[11] Patent Number: 5,140,520
[45] Date of Patent: Aug. 18, 1992

[54] CONVOLUTION PROCESSING METHOD FOR X-RAY TOMOGRAPHIC APPARATUS

[75] Inventor: Shigeru Matsumura, Tokyo, Japan

[73] Assignee: Yokogawa Medical Systems, Limited, Tokyo, Japan

[21] Appl. No.: 368,395

[22] PCT Filed: Dec. 11, 1987

[86] PCT No.: PCT/JP87/00972
§ 371 Date: Jun. 9, 1989
§ 102(e) Date: Jun. 9, 1989

[87] PCT Pub. No.: WO88/04156
PCT Pub. Date: Jun. 16, 1988

[30] Foreign Application Priority Data

Dec. 12, 1986 [JP] Japan .................. 61-296173

[51] Int. Cl.$^5$ ........................ G06F 15/42
[52] U.S. Cl. ................ 364/413.21; 364/413.16
[58] Field of Search .......... 364/413.21, 413.16, 364/413.18

[56] References Cited

U.S. PATENT DOCUMENTS

| | | | |
|---|---|---|---|
| 4,135,247 | 1/1979 | Gordon et al. | 364/413.16 |
| 4,149,248 | 4/1979 | Pavkovich | 364/413.16 |
| 4,707,786 | 11/1987 | Dehner | 364/413.21 |

OTHER PUBLICATIONS

Introduction to Computed Tomography, General Electric, 1976, pp. 15-17.

*Primary Examiner*—Jerry Smith
*Assistant Examiner*—Russell Cass
*Attorney, Agent, or Firm*—Moonray Kojima

[57] ABSTRACT

A method in accordance with the present invention which can make a load imposed on a computer lighter in the case of carrying out the deconvolution processing by use of the computer even when the range of a blur is due to the X-rays radiated from afocal points, wherein the method is characterized by producing data of each channel of an X-ray detector by the weighted addition of the data measured from alternating channels selected from a plurality of channels proceeding and a plurality of channels succeeding the concerned channel.

3 Claims, 5 Drawing Sheets

CONVOLUTION PROCESSING METHOD FOR X-RAY TOMOGRAPHIC APPARATUS

BACKGROUND OF THE INVENTION

1. Technical Field

The present invention relates to an improvement of a deconvolution processing method for eliminating a blur of a reconstructed image in an X-ray tomographic apparatus.

2. Background Art

The schematic construction of an X-ray emission mechanism and an X-ray detection mechanism of an X-ray tomographic apparatus is illustrated in FIG. 3. That is, the X-rays emitted from an X-ray tube are shaped into a fan beam by a collimator 2, transmitted through a reconstruction region 3 in which is placed a body or an object and impinge on an X-ray detector 4 so that the strength of the X-rays incident on respective channels is detected as an electrical signal. As shown in FIG. 4, the electrons 31 emitted from a cathode (not shown) impinge on a target 7 on a rotating anode 6 so that the bombardment energy of the electrons is converted into the X-ray beam 32 which is radiated. Reference numeral 8 designates a focal point on the target 7 which radiate the X-rays in response to the bombardment by the electrons; 9 designates an anode shaft supporting the target 7 which is rotatably supported by bearings 10. The focal point 8 has an extremely small area so that the X-ray radiation becomes the plane radiation. Of the electrons radiated toward the focal point 8, some electrons are rebounded from the focal point 8 and impinge again on the surface of the target 7 except the focal point so that the X-rays radiated from afocal points other than the focal point 8 are produced. The X-rays radiated from the plane focal point and the X-rays radiated from the afocal points are the cause for bluring an image obtained by the tomographic apparatus.

In order to eliminate such blur, the data detected from each channel of the X-ray detector is subjected to the deconvolution processing which will be described briefly below. For instance, when the X-rays are radiated by locating a pin target in the reconstruction region 3 in the mechanism shown in FIG. 3, the X-ray detection signal corresponding to the shadow of the pin target is obtained from the X-ray detector 4 as shown in FIG. 5. In FIG. 5, the abscissa designates the positions of the channels of the X-ray detector while the ordinate represents the X-ray strength. Reference numerals 21 and 22 denote the shadows of the pin and 21 indicates the umbra while 22, the penumbra which causes a blur. The function used to express the profiles such shadows is PSF (Pin Spread Function) which represents the characteristic of the X-ray tube. In order to eliminate a blur, the data of all the channels of the X-ray detector are subjected to the deconvolution processing by utilizing the inverse function obtained in correspondence with PSF. That is, in correspondence with the PSF obtained as a function of the positions of the channels as shown in FIG. 6A, an inverse function 23 which is a function of the positions of the channels is obtained as shown in FIG. 6B. When the deconvolution processing is carried out by using this inverse function and the data of the channels in a range in which is defined a function, the channel data 21 excluding any bluar can be obtained as shown in FIG. 6C.

When the convolution processing is carried out in the manner described above, the skirt of the PSF spreads over many channels because the prenumbral portion due to the radiation of the X-rays from the afocal points extends over a wide range. As a result, the skirt of the inverse function also spreads accordingly so that the channel data which are used in one convolution operation are increased in number. Furthermore, the number of channels of the recently developed tomographic apparatuses is increased and since all the channel data must be subjected to the convolution operation, the number of data to be processed is increased. When the number of channel data used in one convolution processing is increased so that the number of data to be processed is increased, the load on the computer for carrying out the convolution becomes heavy, thereby hindering the image reconstruction at a high speed.

Disclosure of the Invention

The primary object of the present invention is therefore to realize a deconvolution processing method which can decrease the load on a computer even when the range of a blur due to the radiation of X-rays from afocal points.

The method in accordance with the present invention is characterized by producing data of each concerned channel of an X-ray detector by the weighted addition of data obtained by measuring alternating channels selected from a plurality of channels preceding and succeeding the concerned channel.

BEST MODE FOR CARRYING OUT THE INVENTION

Figure 1:
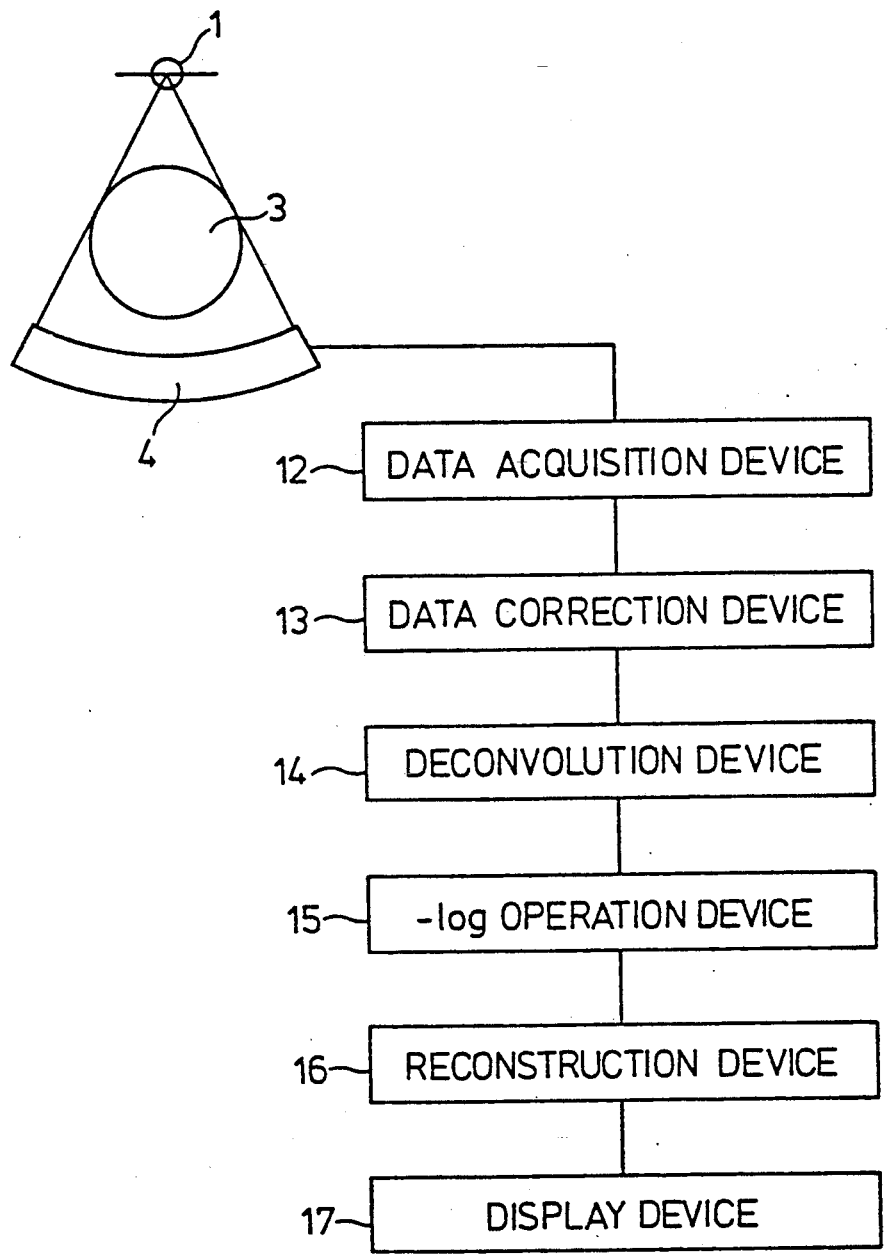
FIG. 1 is a view schematically illustrating the construction of an X-ray tomographic apparatus used to carry out the method in accordance with the present invention.

Now an embodiment of the present invention will be described in detail with reference to the accompanying drawings. In FIG. 1, the X-rays which are radiated from the X-ray tube 1, transmitted through the reconstruction region 3 and impinged on the multi-channel X-ray detector 4 are converted into multi-channel electrical signals by the detector 4 which signals in turn are acquired by a data acquisition device 12. The acquired data are delivered to a data correction device 13 so that a predetermined correction such as the X-ray strength correction is carried out. The corrected data is subjected to the deconvolution processing in a deconvolution device 14 in order to eliminate a blur. Next the −log operation is carried out by a −log operation device 15 and the output thereof is subjected to the image reconstruction process by a reconstruction device 16. The reconstructed image is displayed by a display device 17.

Figure 2:
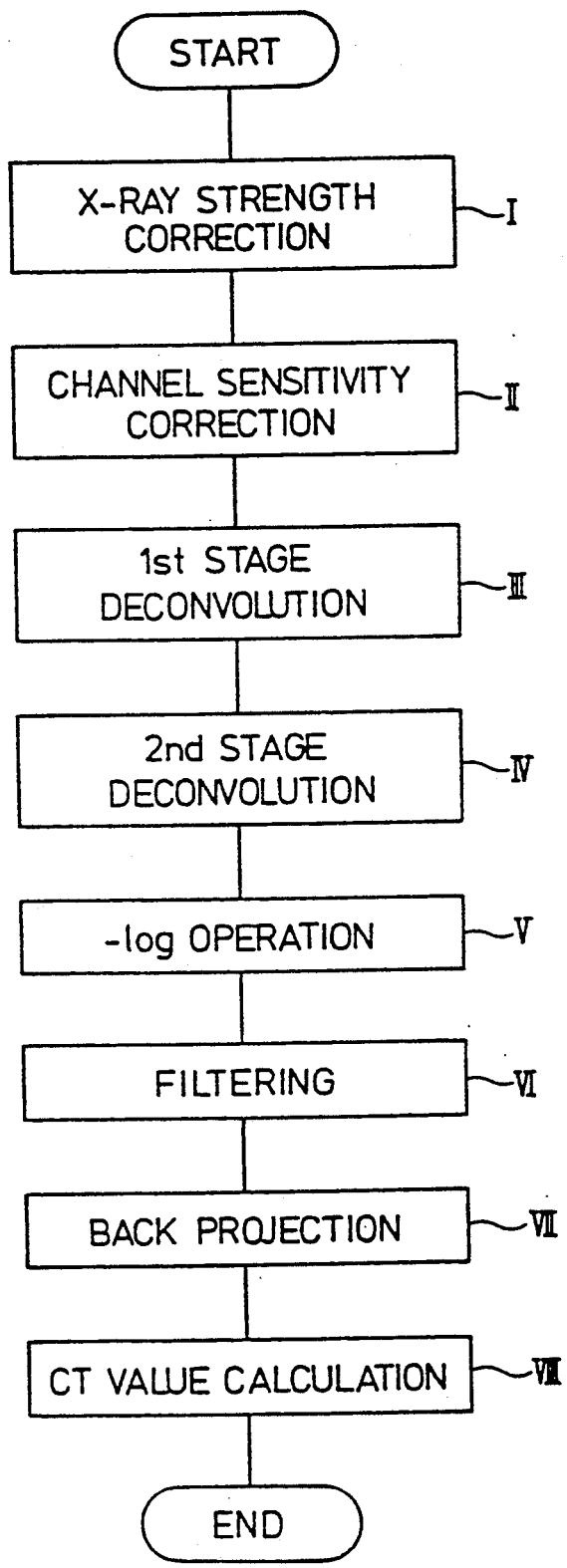
FIG. 2 is a flow chart of method steps used in the invention.
Figure 3:
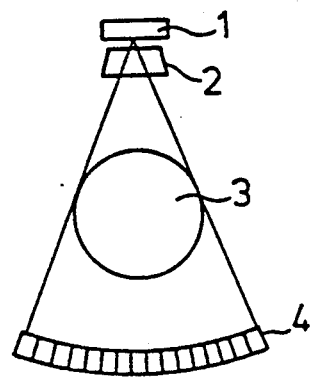
FIG. 3 is a view illustrating the mechanism for radiating and detecting the X-rays thereof.
Figure 4:
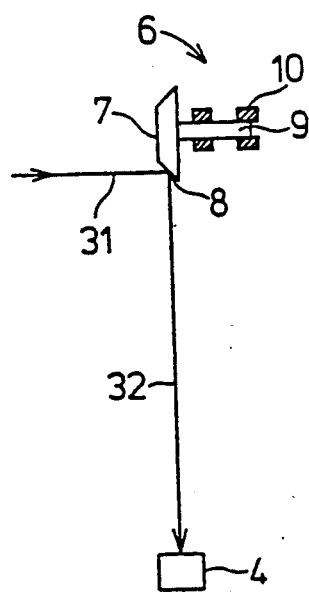
FIG. 4 is a schematic view illustrating an X-ray radiation unit in an X-ray tube.
Figure 5:
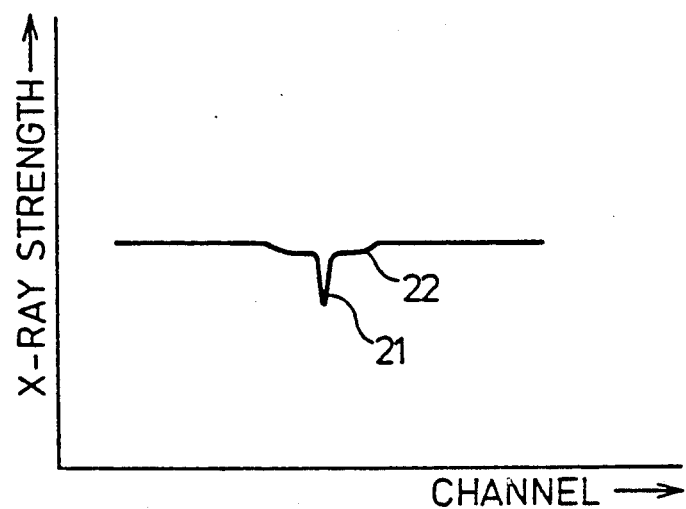
FIG. 5 is a view illustrating the projection data of a pin target.
Figure 6A:
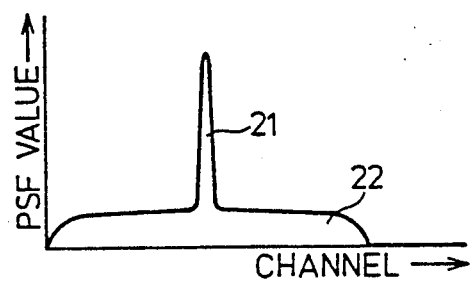
FIGS. 6A, 6B and 6C are views used to explain the convolution processing method.
Figure 6B:
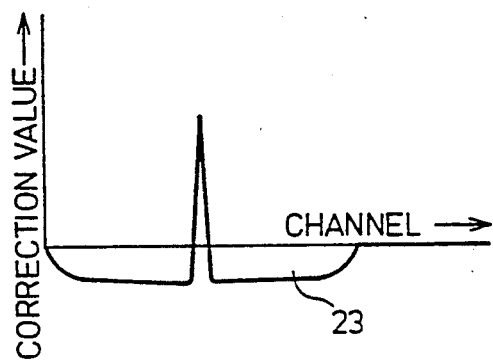
Figure 6C:
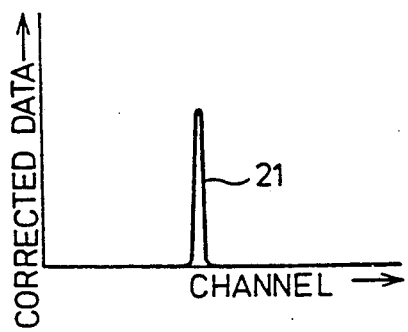

The data processing by the apparatus with the above-described construction will be described in detail with reference to a flowchart shown in FIG. 2. The data obtained by the data acqusion device 12 is subjected to the X-ray strength correction in the step I so that variations in data due to variations in X-ray strength are corrected and in the step II variations in data due to the differences in sensitivity among the channels of the X-ray detector 4 are corrected. These corrections are the general corrections carried out by the tomographic apparatus and are carried out by a data correction device 13. In a deconvolution device 14 the data corrected in the manner described above is subjected to a first deconvolution processing in the step III and then a second deconvolution processing in the step IV by a deconvolution device 14. The first stage deconvolution processing is carried out to eliminate a blur which has a great width due to the radiation of the X-ray radiation from the afocal points and the second stage deconvolution processing is carried out to eliminate a blur which is caused by the radiation of the X-rays from the plane focal point and which has a width smaller than that of the blur due to the radiation of the X-rays from the afocal points. These deconvolution processings are carried out as follows.

The first stage deconvolution is carried out based on the following equation:

$$D_i = \sum_{j=-M}^{M} L_{ij} \cdot U_{i-2j} \quad (1)$$

where
$L_{ij}$: a weight factor used in the first stage convolution processing;
$U_i$: data of a channel i prior to the deconvolution processing;
$D_i$: data of a channel i after the first stage deconvolution processing; and
i: a channel number.

The above-mentioned equation (1) means that the deconvolution processing is carried out by using the data obtained from alternating channels from 2M channels preceeding a channel i and from 2M channels succeeding the channel i. The value of 2M is selected as a large number in correspondence with the large width range of a blur due the radiation of the X-rays from the afocal points, but the data used in deconvolution are alternately selected, the deconvolution processing can be carried out by using the data which is only one half of the data corresponding to the range of blur. As a result, the load on the computer can be decreased. The deconvolution processing described above is repeated for the data of all the channels.

The second stage deconvolution is carried out based on the following equation:

$$E_1 = \sum_{i=-N}^{N} K_{ij} \cdot D_{i-j} \quad (2)$$

where
$K_{ij}$: a weight factor used in the second state deconvolution;
$D_i$: data of channel i after the first stage deconvolution; and
$E_i$: data of the channel i after the second stage deconvolution The above-mentioned equation (2) means that the deconvolution is carried out by using the data of all of a number of N channels preceeding said each channel i as well as the data of all of a number of N channels succeeding said each channel i. The second stage deconvolution processing is similar to the conventional deconvolution processing, but since it is carried out after the first stage deconvolution processing has been carried out, the range N of the channels may be narrower than that of the conventional deconvolution processing. It follows therefore that the number of data used in the second stage deconvolution is less in number and consequently the load imposed on the computer becomes light.

It must be pointed out there that it is not aways necessary to carry out the second stage and that it may be eliminated when a blur has been satisfactorily eliminated only by the first stage deconvolution processing. The first and second deconvolution processings are carried out in two stages, but they can be carried out in one stage as will be described below. That is, of all the channels proceeding to and suceeding from a predetermined channel, all the channels in the vicinity of said predetermined channel are used and of the channels except those in the vicinity of said predetermined channel, alternately selected channels are used in the deconvolution processing. Then the same result as that attained by the first and second stage processings are carried out in two stages.

The data which has undergone such deconvolution processings is converted to the data representative of the X-ray absorbed dose by the $-\log$ operation in the step V and after filtering in the the step VI, the converted data is subjected to the back projection processing in the step VII so that an image is reconstructed. The reconstructed image is converted into a CT value in the step VIII. The processing of the data after the step V is the general data processing carried out in the conventional tomographic apparatus by the $-\log$ operation device 15 and the reconstruction device 16.

So far the best mode of operation for carrying out the present invention has been described, but it is apparent for any person skilled in the art to which the present invention pertains or with which the present invention is most nearly connected to effect various modifications without departing the scope of the appended claims.

What is claimed is:

1. In a tomographic image reconstruction method comprising the steps of filtering and back projection, the improvement comprising a deconvolution step for eliminating a blur in an image resulting from image reconstruction by utilizing data obtained from a multichannel X-ray detector which detects X-rays transmitted through an image reconstruction region, wherein the deconvolution step is separate from and prior to the said steps of filtering and back projection and comprises the step of producing data of a particular channel of said X-ray detector by weighted addition of data measured from channels alternately selected from a plurality of channels preceding said particular channel and a plurality of channels succeeding said particular channel.

2. In a tomographic image reconstruction method comprising the steps of filtering and back projection, the improvement comprising a deconvolution step for eliminating a blur in an image resulting from image reconstruction by utilizing data obtained from a multichannel X-ray detector which detects X-rays transmitted through an image reconstruction region, wherein the deconvolution step is separate from and prior to the said steps of filtering and back projection and comprises the substeps of a first stage processing for producing data of a particular channel of said X-ray detector by weighted addition of data measured from channel alternately selected from a plurality of channels preceding said particular channel and a plurality of channels succeeding said particular channel; and a second stage processing for producing data of said particular channel by weighted addition of data which is smaller in number than data from the plurality of channels preceding and succeeding said particular channel which were processed in said first stage processing.

3. In a tomographic image reconstruction method comprising the steps of filtering and back projection, the improvement comprising a deconvolution step for eliminating a blur in an image resulting from image reconstruction by utilizing data obtained from a multichannel X-ray detector which detects X-rays transmitted through an image reconstruction region, wherein the deconvolution step is separate from and prior to the said steps of filtering and back projection and comprises the step of producing data of a particular channel of said X-ray detector by using all of the data measured from channels immediately preceding and succeeding said particular channel, and weighted addition of all data measured from channels alternately selected beyond the plurality of channels immediately preceding and succeeding the particular channel.

* * * * *